July 23, 1946.    K. R. ELDREDGE ET AL    2,404,569
REGENERATIVE DETONATION DETECTOR
Filed March 6, 1944

INVENTORS
KENNETH R. ELDREDGE
VINCENT C. DAVIS

BY *J. H. Adams*
ATTORNEY

Patented July 23, 1946

2,404,569

UNITED STATES PATENT OFFICE 2,404,569

REGENERATIVE DETONATION DETECTOR

Kenneth R. Eldredge, Berkeley, and Vincent C. Davis, Piedmont, Calif., assignors, by mesne assignments, to California Research Corporation, San Francisco, Calif., a corporation of Delaware Application March 6, 1944, Serial No. 525,294

6 Claims. (Cl. 179—2)

This invention relates to a detonation detector adapted to indicate the presence or absence of detonation in an internal combustion engine and particularly relates to an arrangement for an aircraft in which the internal combustion engine is mounted and which also has a communications system in which the detonation indication will be evidenced by a background signal audible to the pilot or engineer of said aircraft.

Heretofore attempts have been made to indicate visually to the pilot or engineer of an airplane the existence of detonation in one or more engines of the aircraft. These devices have utilized indicating meters having a scale and pointer and arbitrarily calibrated in detonation intensity units or have consisted of neon lamps or other types of voltage indicators which would flash intermittently when the detonation within the engine reached a certain degree of intensity.

This invention comprehends broadly the provision of an electrical arrangement including means responsive to detonation in one or more cylinders of an internal combustion engine to produce an alternating voltage signal together with means including the communications system of said aircraft that will give to the pilot an audible indication in the system which is normally used for communicating within the aircraft, between different aircraft, or between aircraft and stations on the earth.

It is an object of this invention to provide an improved internal combustion engine detonation detecting arrangement which will require a minimum amount of apparatus and which is adapted to utilize audible signaling equipment normally found on aircraft.

Another object is to provide an improved detonation detecting system which may be used by a pilot at the same time he is communicating with others in the same aircraft, with other aircraft, or with stations on the earth, the indication being in the form of a distinctive audible background signal which will not interfere with normal communications.

Another object is to provide a system of this kind which will have a constant energy level output so that any degree of detonation above a predetermined minimum will give the same response in the audible signalling system.

These and other objects and advantages will be found apparent from the following description and from the attached drawing which forms a part of this specification and illustrates a preferred embodiment of the invention together with an alternative form which has been found usable under certain circumstances.

Figure 1:
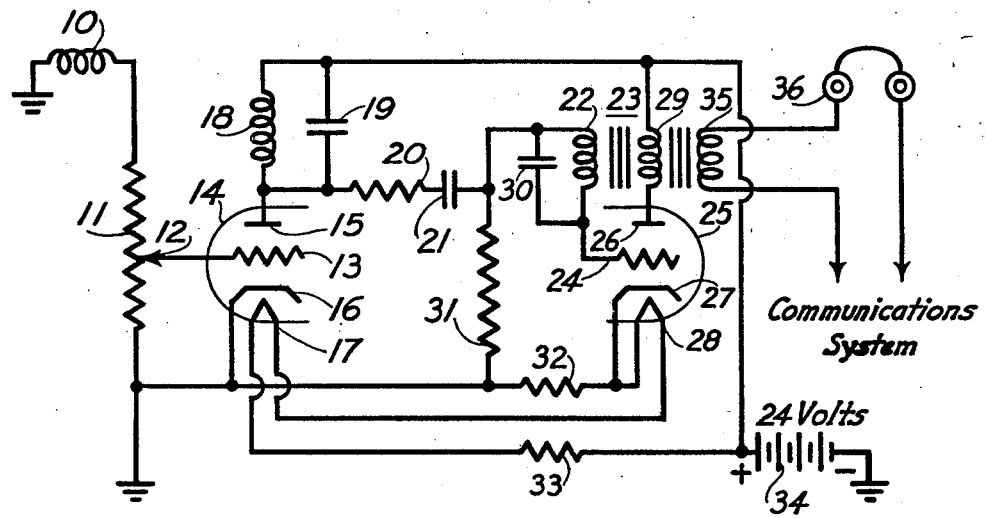
Figure 1 is a connection diagram showing a preferred embodiment of this invention as applied to an aircraft having an internal combustion engine and a conventional communications system which may include means for intercommunication within the aircraft as well as radio communications, both voice and code, outside the aircraft.

Referring to Figure 1, reference numeral 10 designates generally a detonation pickup unit, for example, that of the K. R. Eldredge Patent No. 2,269,760, suitably mounted to communicate with a cylinder of the internal combustion engine in which detonation is to be detected. Other types which may be secured to the outside of the engine cylinder or frame and are responsive to mechanical vibrations due to detonation rather than pressure changes in the engine cylinder, as in the apparatus of the patent just identified, may equally well be used, so long as they are adapted to provide an alternating voltage output that varies as some function of the intensity or degree of detonation within the engine. Connected to pickup unit 10 of this example is an attenuator 11 having a movable contact 12, so that any desired proportion of the electrical output of unit 10 may be impressed upon the grid 13 of a thermionic amplifier tube 14, which is provided with the usual plate 15, cathode 16, and heater element 17.

Desirably an inductance 18 and capacitance 19 are connected to the output or plate 15 of tube 14 to form a tuned circuit which will resonate at some outstanding engine detonation frequency, for example 6,000 cycles per second. Plate 15 of amplifier 14 is coupled by means of resistor 20, capacitor 21, and the primary winding 22 of an iron-core regeneration or feed-back transformer 23, to the grid 24 of a thermionic oscillator tube 25, the latter being provided with the usual plate 26, cathode 27 and heater element 28. Secondary winding 29 of transformer 23 is connected to plate 26 of tube 25 and to the resonant circuit 18—19 of the amplifier tube 14, to provide a regeneration or feed-back to primary 22 and grid 24. The frequency of the oscillations thus produced may be controlled by a tuning capacitor 30 across primary 22, and is chosen to be within the audible range, preferably distinct from those frequencies which may normally be heard in the communications system, to be described below.

A grid resistor 31 and bias resistor 32 for tube 25 are connected as shown, and heater elements 17 and 28 of both tubes may be energized through resistor 33 from the plate potential source which may be battery 34. Grid 24 is normally biased to cut-off by resistor 32 so that oscillator 25 will not function as such unless a positive voltage impulse of predetermined magnitude is impressed upon grid 24. Desirably both amplifier 14 and oscillator 25 may be contained in one tube, such as a 12SL7. A tertiary winding 35 of transformer 23 is adapted to pick up the audio frequency output of tube 25 and couple or otherwise impose it upon a suitable indicator such as earphones 36. The indicator connection of Figure 1 is adapted for use with a low impedance transformer output. Due to the regeneration effect of the preferred arrangement of Figure 1, it will be found to have a larger output with fewer tubes than a normal or conventional amplifier that does not have the feed-back feature.

Although a single example of an oscillator is illustrated, it is obvious that other well known types may be substituted therefor.

In operation, attenuator 11 is adjusted so that only those alternating voltage signals that are due to detonation of a predetermined value in the engine on which pickup unit 10 is mounted and which are impressed thereby upon grid 13 will be of adequate amplitude after being amplified by tube 14 and impressed upon grid 24 of oscillator 25 to cause the latter to oscillate. When these impulses cause grid 24 to become sufficiently positive, damped audio frequency wave trains will be regeneratively produced by the transfer of energy between plate 26 and grid 24, due to feed-back between primary 22 and secondary 29 of transformer 23. The persistence of these trains of audio frequency oscillations will depend upon the time constant of the grid circuit of tube 25, controlled by the value of resistors 20 and 31. This value is so chosen that there is not enough feed-back to set up continuous oscillations but only those peak voltages above a predetermined value that reach grid 24 are adequate to initiate the operations just outlined and cause the audio frequency trains to die out after a relatively short period. A particular advantage of such an arrangement and mode of operation is that the separate recurrent discharges of oscillator tube 25 to earphones 36 are at a constant energy level independent of the original impulse that energizes grid 24, so that the audio frequency signals impressed upon the communications system are at a constant controllable intensity as well as pitch and will not vary with detonation intensity changes so as to interfere with the normal use of the communications system.

Figure 2:
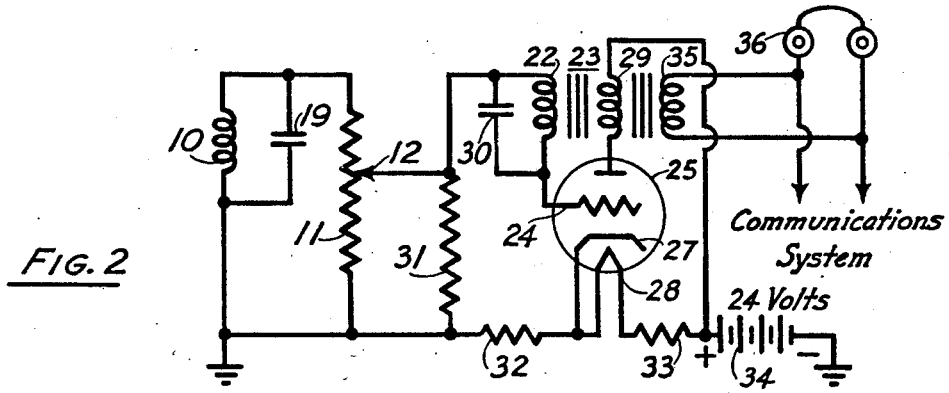
Figure 2 is a simplified arrangement similar to that of Figure 1, but using a detonation pickup unit having an electrical output of sufficient magnitude to require no amplification.

The simplified arrangement of Figure 2 is adapted for use where the original electrical output of the detonation pickup unit 10 is adequate directly to trip the grid 24 of the oscillator tube 25, so that no amplification is required. Corresponding reference numerals are used for the elements represented in the two figures. In Figure 2 the detonation frequency resonant circuit corresponding to 18—19 is provided by the natural inductance of the winding usually present in unit 10 and by a capacitor 19. The rest of the circuit needs no specific explanation to one skilled in this art in view of the description already given, the only material difference being in the connection of the earphones 36 to the tertiary winding 35 of transformer 23, which, in this case, is adaptable to match a high impedance circuit in the communications system, instead of a low impedance circuit as in Figure 1.

Although only two examples have been illustrated and described, it is obvious that many changes and modifications could be made without departing from the invention, which is believed to reside in the combination of means responsive to detonation in the engine for producing corresponding electrical impulses, an electrical oscillator of any known type incapable of continuous oscillation adapted to be tripped by impulses of a predetermined amplitude, to initiate damped audio frequency wave trains of short duration, and means for impressing said wave trains upon the audible signal responsive means of a communications system to give a background indication of the presence of engine detonation, without interfering with the normal use of the said communications system. Accordingly, all such changes and modifications that come within the scope of the appended claims are embraced thereby.

We claim:

1. An internal combustion engine detonation detector for aircraft having a communications system including audible signal responsive means, comprising means responsive to detonation in said engine and adapted to give an alternating voltage output which is a function of detonation intensity, an electrical oscillator adapted to be tripped by impulses of predetermined amplitude from said first named means to give damped audio frequency wave trains and means for impressing said wave trains upon the audible signal responsive means of said communications system to give an indication of the presence or absence of detonation in said engine.

2. An internal combustion engine detonation detector according to claim 1, in which the last named means comprises a transformer coupling the output of said oscillator to said audible signal responsive means.

3. An internal combustion engine detonation detector according to claim 1, in which said last named means comprises a multi-winding transformer, one winding coupling the output of said oscillator to said audible signal responsive means and another winding coupling regeneratively the output of said oscillator to the input thereof.

4. An internal combustion engine detonation detector for an aircraft having a communications system including audible signal responsive means and means responsive to detonation in said engine to produce an electrical voltage output which is a function of detonation intensity, comprising an electrical oscillator biased to prevent continuous operation, means for impressing at least a proportional part of the voltage output of said detonation responsive means upon said oscillator to initiate damped audio frequency wave trains therein, and coupling means for impressing said damped audio frequency wave trains upon the audible signal responsive means of said communications system to give a background indication of the presence of detonation in said engine.

5. An internal combustion engine detonation detector according to claim 4, in which said coupling means comprises a multi-winding transformer, one winding of which regeneratively couples the output of said oscillator to the input thereof.

6. An internal combustion engine detonation detector for aircraft having a communication system including means for producing audible signals and means responsive to detonation in said engine to produce an electrical voltage output which is a function of detonation intensity, comprising an electrical oscillator connected to said detonation responsive means and biased to be actuated therefrom only by voltages having a predetermined minimum amplitude to initiate audio frequency wave trains of short duration, and means for impressing said wave trains upon the audible signal producing means of said communication system to give an indication of detonation in said engine.

KENNETH R. ELDREDGE.
VINCENT C. DAVIS.